US011651313B1

(12) United States Patent
Fridakis

(10) Patent No.: US 11,651,313 B1
(45) Date of Patent: May 16, 2023

(54) INSIDER THREAT DETECTION USING ACCESS BEHAVIOR ANALYSIS

(71) Applicant: Amazon Technologies, Inc., Seattle, WA (US)

(72) Inventor: Stephen George Fridakis, Briarcliff Manor, NY (US)

(73) Assignee: Amazon Technologies, Inc., Seattle, WA (US)

( * ) Notice: Subject to any disclaimer, the term of this patent is extended or adjusted under 35 U.S.C. 154(b) by 770 days.

(21) Appl. No.: 14/697,523

(22) Filed: Apr. 27, 2015

(51) Int. Cl.
*G06Q 10/06* (2012.01)
*H04L 67/50* (2022.01)
*G06Q 10/0635* (2023.01)

(52) U.S. Cl.
CPC ....... *G06Q 10/0635* (2013.01); *H04L 67/535* (2022.05)

(58) Field of Classification Search
CPC ... G06F 21/55; G06F 17/30289; G06Q 10/06; G06Q 10/107; G06Q 10/0635
See application file for complete search history.

(56) References Cited

U.S. PATENT DOCUMENTS

| 7,373,666 | B2* | 5/2008 | Kaler ............... G06F 21/554 709/223 |
| 7,882,349 | B2 | 2/2011 | Cam-Winget et al. |
| 8,365,290 | B2 | 1/2013 | Young |
| 8,375,444 | B2* | 2/2013 | Aziz ............... G06F 21/56 713/193 |
| 8,789,192 | B2 | 7/2014 | LaBumbard |
| 8,793,790 | B2 | 7/2014 | Khurana et al. |
| 8,839,441 | B2 | 9/2014 | Saxena et al. |
| 8,856,894 | B1* | 10/2014 | Dean ............... H04L 63/08 713/175 |
| 8,880,893 | B2 | 11/2014 | Moghe et al. |
| 9,043,905 | B1* | 5/2015 | Allen ............... G06F 21/577 726/22 |
| 9,088,560 | B1* | 7/2015 | Newstadt ............... H04L 63/08 |
| 9,652,464 | B2* | 5/2017 | Ogawa ............... G06F 16/13 |
| 10,412,106 | B2* | 9/2019 | Srivastava ............... H04L 63/1466 |

(Continued)

FOREIGN PATENT DOCUMENTS

WO WO-2014021870 A1 * 2/2014 ............. H04L 41/12

OTHER PUBLICATIONS

"Insider Threat: User Identification via Process Profiling", by Steven J. McKinney, Computer Networking, North Carolina State University, Raleigh, North Carolina, 2008. (Year: 2008).*

(Continued)

*Primary Examiner* — Pan G Choy
(74) *Attorney, Agent, or Firm* — Robert C. Kowert; Kowert, Hood, Munyon, Rankin & Goetzel, P.C.

(57) ABSTRACT

A security threat candidate (STC) detector examines a set of activity log records representing access requests directed to data artifacts by various entities of an organization. In a first threat analysis, the STC detector determines that an activity log record indicates a use of an access path which is not present in a database of legitimate access paths for an entity. In a second threat analysis, the STC detector determines whether the behavior of the entity matches a stored suspect behavior pattern template. Results of the first and/or second analysis are transmitted to a selected security management component of the organization.

19 Claims, 9 Drawing Sheets

(56) References Cited

U.S. PATENT DOCUMENTS

| | | | |
|---|---|---|---|
| 2004/0064726 A1 | 4/2004 | Girouard | |
| 2005/0188423 A1* | 8/2005 | Motsinger | H04L 63/0876 726/22 |
| 2007/0209074 A1* | 9/2007 | Coffman | G06F 21/552 726/23 |
| 2008/0005782 A1* | 1/2008 | Aziz | G06F 21/554 726/3 |
| 2008/0034425 A1* | 2/2008 | Overcash | G06F 21/55 726/22 |
| 2008/0126277 A1* | 5/2008 | Williams | G06F 19/3481 706/14 |
| 2008/0148398 A1* | 6/2008 | Mezack | G06F 21/55 726/22 |
| 2011/0225650 A1* | 9/2011 | Margolies | G06Q 10/06 726/22 |
| 2012/0030767 A1* | 2/2012 | Rippert, Jr. | G06Q 10/10 726/25 |
| 2013/0024239 A1* | 1/2013 | Baker | G06Q 40/06 705/7.28 |
| 2013/0091085 A1* | 4/2013 | Sohn | G08B 31/00 706/46 |
| 2013/0091539 A1* | 4/2013 | Khurana | H04L 63/1425 726/1 |
| 2014/0137228 A1 | 5/2014 | Shema et al. | |
| 2015/0101053 A1* | 4/2015 | Sipple | H04L 63/1425 726/24 |
| 2015/0256621 A1* | 9/2015 | Noda | G06F 3/0644 709/226 |
| 2016/0174075 A1* | 6/2016 | Bolton | H04L 63/10 726/5 |

OTHER PUBLICATIONS

"Research on Mitigating the Insider Threat to Information Systems—#2", Anderson et al., National Defense Research Institute, Proceedings of a Workshop Held Aug. 2000. (Year: 2000).*

"Detection of Anomalous Insiders in Collaborative Information Systems", by You Chen, Steve Nyemba, and Bradley Malin, EEE Computer Society. IEEE Transactions on Dependable and Secure Computing, vol. 9, No. 3, May/Jun. 2012. (Year: 2012).*

"Leveraging Machine Learning for Security Related Decision Making", by Christopher S. Gates, Purdue University, Aug. 2014. (Year: 2014).*

"Detecting Malicious Insider Threat in Cloud Computing Environment", by Nikolaos Pitropakis, Systems Security Laboratory Department of Digital Systems, University of Piraeus, 2015. (Year: 2015).*

Karen Mercedes Goertzel, et al., "Software Security Assurance: State-of-the-Art Report", IATAC, Jul. 31, 2007, pp. 1-367.

Stephen R. Band, Ph.D., et al., "Comparing Insider IT Sabotage and Espionage: A Model-Base Analysis", Software Engineering Institute, Dec. 2006, pp. 1-92.

Dawn Cappelli, et al., "Common Sense Guide to Prevention and Detection of Insider Threats" Software Engineering Institute, Jan. 2009, pp. 1-88, 3rd Edition, Version 3.1.

FL Greitzer, et al, "Identifying at-Risk Employees: A Behavioral Model for Predicting Potential Insider Threats", US Department of Energy, Sep. 30, 2010, pp. 1-46.

Michelle Keeney, J.D., Ph.D, et al., "Insider Threat Study: Computer System Sabotage in Critical Infrastructure Sectors", U.S Secret Service and CERT Coordination Center/SEI, May 2005, pp. 1-45.

Marisa Reddy Randazzo, Ph.D., et al., "Insider Threat study: Illicit Cyber Activity in the Banking and Finance Sector", U.S. Secret Service and CERT® Coordination Center, Aug. 2004, pp. 1-24.

Gary Locke, et al, "Guide for Applying the Risk Management Framework to Federal Information Systems—A Security Life Cycle Approach", National Institute of Standards and Technology, Feb. 2010, pp. 1-93, Special Publication 800-37.

Dr. Bruce Gabrielson, "Insider Threat Workshop" Griffis Institute, Aug. 15, 2013, pp. 1-11.

"USCERT Federal Incident Notification Guidelines," downloaded Jan. 30, 2015 from https:l/www.uscert. gov/ incidentnotificationguidelines, pp. 1-6.

"Vulnerabilities," downloaded Jan. 30, 2015 from http://www.securityfocus.com/, 2010 copyright SecurityFocus, pp. 1-2.

"OVAL Open Vulnerability and Assessment Language," AVAL, downloaded Jan. 30, 2015 from http://oval.mitre.org/ pp. 1-2.

"Orthogonal Defect Classification," IBM, downloaded Jan. 30, 2015 from http://researcher.watson.ibm.com/researcher/view_group.php?id=480, 1 page.

"NVD Data Feeds," downloaded Jan. 30, 15 from http://nvd.nist.gov/download.cfm, pp. 1-3.

"Common Vulnerabilities and Exposures—CVE List Main Page," CVE, downloaded Jan. 30, 2015 from https:l/cve.mitre.org/eve/, 1 page.

U.S. Appl. No. 14/659,019, filed Mar. 16, 2015, Stephen George Fridakis.

* cited by examiner

INSIDER THREAT DETECTION USING ACCESS BEHAVIOR ANALYSIS

BACKGROUND

In recent years, more and more computing applications are being implemented in distributed environments. A given distributed application may, for example, utilize numerous physical and/or virtualized servers spread among several data centers of a provider network, and may serve customers in many different geographical locations. A large corporation or government entity may utilize the resources of one or more cloud infrastructure providers for many different applications, with at least some of the applications interacting with each other and with other applications being run on customer-owned premises. Many such applications may deal with highly confidential data artifacts, such as financial records, health-related records, intellectual property assets, and the like.

As evidenced by the increasing number of recent news reports regarding successful network-based attacks on various businesses, the need for better approaches towards preventing the theft or misuse of business-critical or confidential data continues to grow. Some existing techniques, such as the deployment of virus-scanning software on an enterprise's computer systems, or the enforcement of requirements for non-trivial passwords, address small partitions of the data security problem space. However, especially in environments in which some of the security-sensitive assets may be stored in virtualization-based cloud environments, many organization managers may be unaware of all the types of vulnerabilities that may apply to their assets.

In particular, it may not be straightforward for organizations to detect insider attacks quickly enough to avoid damaging security lapses. Insider attacks may, for example, be initiated by unhappy or disgruntled employees who happen to have enough knowledge about the information security policies of an organization to be able to exploit vulnerabilities. In some cases, automated programs running within trusted domains of an organization may be involved in insider attacks as well. Because of the trust placed in certain employees and programs, which may be participants in an organization's most critical decisions and operations, undetected insider attacks may in some cases have the potential for causing widespread and long-lasting damage.

Figure 1:
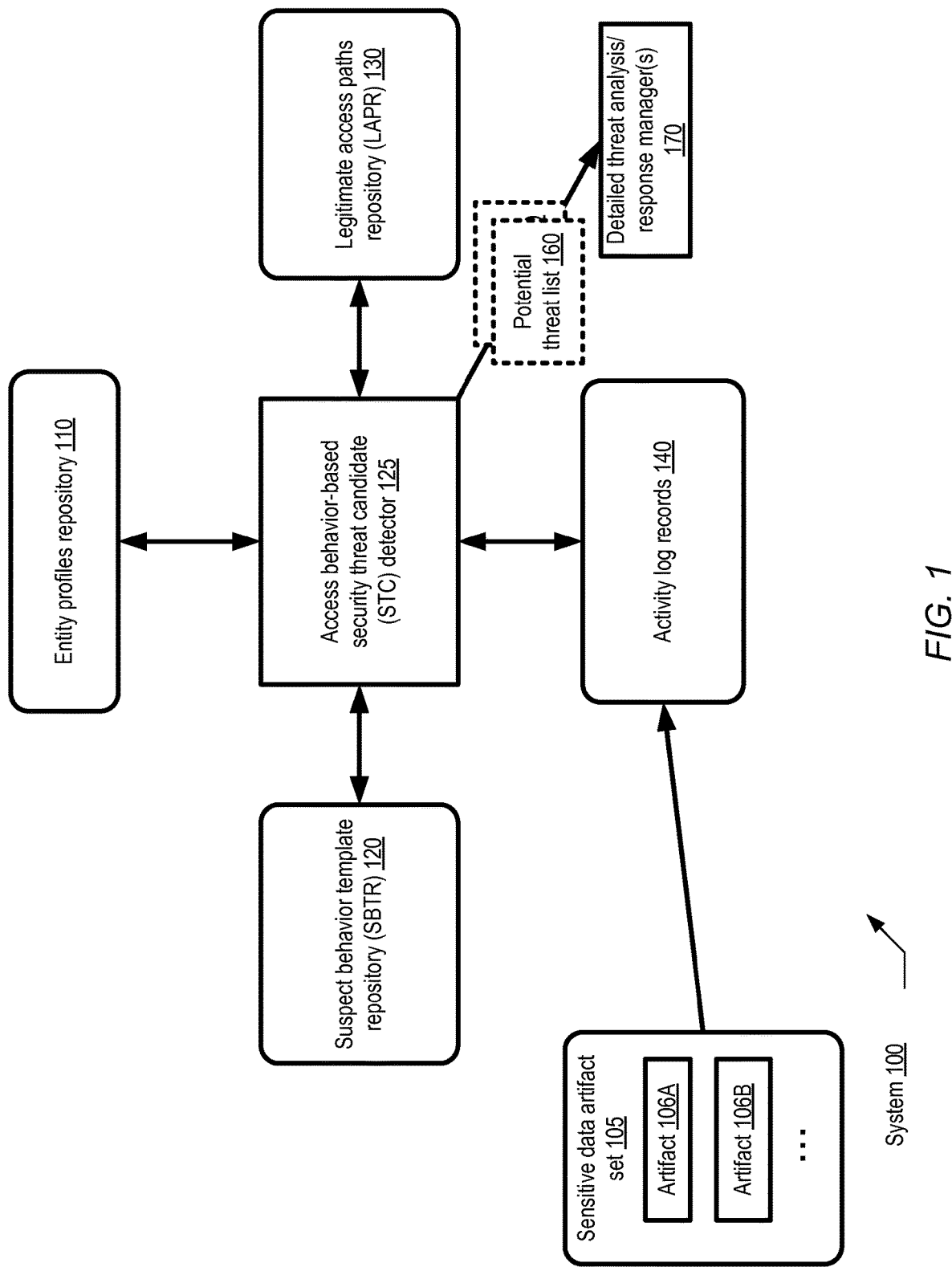
FIG. 1 illustrates example high-level components of a system which may be used to detect potential insider attacks directed at security-sensitive artifacts of an organization, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing automated insider security threat detection based on access behavior analysis at an organization are described. The term "insider security threat", as used herein, may refer to various types of threats or actions targeting sensitive assets and/or security policies of an organization, involving the participation of one or more entities or actors from within the organization itself. In at least some embodiments, a combination of several different kinds of information vectors (which may for example be based on metadata regarding suspect behavior patterns, legitimate access paths, and entity profiles of the potential participants in security threats as described below) may be used to quickly identify potential cases of insider-initiated security attacks, ideally before widespread damage can be caused to the organization. Although applicable in a wide variety of contexts, the described approach for detecting potential security attacks initiated within the targeted organization may be particularly helpful in scenarios in which at least some of the security-sensitive data of the organization is stored at least temporarily at provider network resources which may be accessible via multiple pathways. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks in this document. Provider networks may also be referred to as "public cloud" environments. At least some of the services of a provider network (and hence, some of the resources whose accesses may need to be monitored for possible security threats) may rely on virtualization in some embodiments—e.g., virtual machines may be used as the units of computing assigned to clients of a computing service, and virtualized software objects may be provided to clients of a storage service.

According to at least some embodiments, an insider threat detection system (ITDS) may comprise a plurality of metadata repositories, each comprising information vectors or entries of one or more types which may be analyzed together with activity log records collected from various parts of the organization. One such metadata repository may comprise, for example, a set of suspect behavior templates (SBTs), indicative of patterns of behavior that have been identified as being correlated with insider-initiated security attacks. The contents of the SBT repository (SBTR) may include, for example, descriptors of anomalous or unusual behavior of employees and/or programs which may signal that there is some non-zero probability that an insider is attempting (or going to attempt) a breach of one or more security policies. Examples of SBTs may include repeated failed attempts to access certain classes of data artifacts, attempts to transfer unusually large amounts of data, attempts to use non-standard data transfer mechanisms, and so on. Numerous examples of suspicious behavior templates are discussed below in further detail. In at least some embodiments, at least some SBTs may be generated as a result of post-mortem analyses of actual or attempted security breaches, e.g., using various machine learning algorithms and/or artificial intelligence techniques The ITDS may include a legitimate access paths repository (LAPR) in various embodiments, indicating, for various data artifacts and entities, the expected or approved ways in which the data artifacts would typically be accessed by the entities. In at least some embodiments, the ITDS may also include an entity profile repository or database, which may contain information regarding the roles and responsibilities of various entities (e.g., employees and/or programs) which have access to security-sensitive data artifacts of the organization. In addition, in some embodiments the ITDS may rely on a plurality of activity log record collectors associated with various resources at which the data artifacts of the organization are stored. Each log record collected may indicate a respective access attempt (e.g., a read or write, either successful or unsuccessful) directed towards one or more data artifacts.

In one embodiment, a security threat candidate (STC) detector of the ITDS may utilize some or all of the above-mentioned repositories and the log records in an iterative multi-level analysis as follows. Within a given analysis iteration, the STC detector may examine a set of activity log records associated with some set of data artifacts. In some embodiments, the activity log records may be examined in sorted order based at least in part on one or more risk-related properties of the corresponding artifacts or the entities whose accesses were logged—e.g., log records of those artifacts which have the highest levels of security sensitivity may be examined first, or log records indicating activities of entities with the highest levels of access to sensitive data may be examined first. Activity log records associated with both types of entities—employees as well as automated programs—may be examined within the same analysis iteration in at least some embodiments.

The STC detector may determine whether any of the accesses indicated in the activity logs were unauthorized or illegitimate, e.g., by comparing the actual accesses to entries for the corresponding (entity, artifact) combinations in the LAPR. If at least one illegitimate access is detected with respect to a particular entity, in some embodiments the STC detector may determine whether an overlap exists between a behavior of the particular entity and one or more suspect behavior templates stored in the SBTR. In some embodiments, this second level of threat analysis (checking for matches between previously-identified suspect behavior patterns and the activities of the entity) may be triggered by the first level of analysis (the discovery of an illegitimate access path). In other embodiments the two levels of threat analysis may be performed independently of each other: that is, the STC detector may check for matches with suspect behavior patterns regardless of whether an illegitimate access is detected. In some cases, the set of activity log records examined for the two different analyses may differ—e.g., a larger set of activity log records may be examined for suspect behavior pattern matching than for simply identifying unauthorized accesses.

In various embodiments, results of the illegitimate access path checking and/or the suspect behavior pattern matching may be provided to other components of a security management system, e.g., for more detailed verification as to whether an actual security attack is in progress and/or to initiate responsive actions. A wide variety of responsive actions may be taken in different embodiments, such as the disabling of one or more network paths used to access the artifacts, the revocation of access rights to one or more data artifacts, the transmission of warnings or the initiation of disciplinary actions with respect to the offending entities. In some embodiments, the STC detector may itself initiate one or more of such responsive actions, e.g., instead of or in addition to providing the results of its analyses to other security management components. In various embodiments, the preliminary conclusions of the STC detector regarding possible insider threats may be further risk-weighted or modulated based on the entity profile vectors—e.g., if the profile of an employee Emp1 involved in a potential threat indicates that Emp1 has access to extremely sensitive documents such as intellectual property assets or contract negotiation records, or has been tagged as a disgruntled or unhappy employee, the STC detector may prioritize the responsive actions higher for Emp1 relative to the responsive actions triggered for other employees.

In one embodiment, the results of the STC detection analyses may be sent to a particular security management component selected from among a plurality of such components based on the risk weight attached to the results (or the entities/artifacts). For example, in some cases, a security management component capable of an immediate response may be selected because of a very high risk that a significant attack is underway or imminent, while in other cases, a different security management component that may simply generate a warning e-mail at some later time may be selected based on a lower risk assessment. The components to which the STC detector's results are provided may in some cases perform a more detailed analysis, which may yield the result that the suspected accesses do not represent an attack—e.g., because the employee or computer program was actually supposed to have permissions for their accesses, although such permissions had not been recorded in the LAPR for some reason. In such a scenario, the LAPR may be updated to avoid similar false alarms in the future. Thus, in at least some scenarios, the operations of the STC detector may gradually improve the overall security profile of the organization over time, even if some of the results provided by the STC happen to be false positives.

One or more of the ITDS components (e.g., the STC detector, the SBTR, the LAPR, and/or the entity profile repository) may be implemented as an add-on to an existing security monitoring infrastructure in some embodiments. In other embodiments, one or more of the ITDS components may be implemented at standalone devices. In at least some embodiments, at least some components of the ITDS may be implemented at computing devices within a provider network, while other components may be implemented at customer-owned premises or customer-managed premises outside the provider network.

In some embodiments, the ITDS may implement one or more programmatic interfaces (e.g., a web-based console, a set of APIs (application programming interfaces), command line tools and the like) which enable authorized parties of the organization to configure or update various ITDS components. For example, a set of interfaces may enable human resource (HR) department employees and/or information technology (IT) department employees to enter or modify profile information for various employees and/or automated programs into the entity profile repository of the ITDS. Automated tools similar in concept to web crawlers may be used to populate the legitimate access paths repository in some embodiments, e.g., based at least in part on a set of target assets identified as being security-sensitive and/or in part on entity profile information such as roles/responsibilities of the employees. In at least one embodiment, a learning engine may be used to detect correlations between access behavior patterns and subsequent insider attacks, and the output of the learning engine may be used to populate the SBTR. A wide variety of activity log trackers, distributed across the devices of one or more provider network data centers and/or customer premises, may be employed in various embodiments. In at least some embodiments, the raw activity log records may be normalized using a unified taxonomy developed for security management at the organization—e.g., baseline log records in various formats and with mutually incompatible fields may be transformed into a common layout or format for the purposes of the ITDS.

Overview of Behavior-Based Insider Threat Detection

FIG. 1 illustrates example high-level components of a system which may be used to detect potential insider attacks directed at security-sensitive artifacts of an organization, according to at least some embodiments. As shown, system 100 includes a sensitive data artifact set 105 comprising a plurality of artifacts (e.g., artifacts 106A, 106B etc.) which may include proprietary or confidential information about the organization. A number of different kinds of artifacts may be included in the data artifact set 105 in different embodiments, such as HR (human resources) records, intellectual property assets (e.g., trade secrets or invention designs), software programs, business negotiation or contract-related documents and the like. The organization may have a set of security policies to protect its data artifacts, and the detection of internally-generated violations of the security policies may be implemented using a number of repositories of information vectors in the depicted embodiment.

A suspect behavior template repository (SBTR) 120 may contain representations of behaviors (e.g., employee behavior, and/or behavior of automated programs) that have been found to be correlated with, or indicative of, insider attacks. In some embodiments, the SBTR may be populated based on root cause analysis of various security attacks directed at the organization, while in other embodiments at least some suspicious behavior templates may be derived from published reports generated by security consortia, government agencies and the like. The behavior templates stored in the SBTR may include, for example, unusual or anomalous amounts of data transfer, repeated attempts to access objects without the required permissions, extensive use of unusual data transfer mechanisms (such as universal serial bus (USB) drives), and so on.

A legitimate access path repository (LAPR) 130 may contain records indicating acceptable or authorized means by which various data artifacts 106 may be accessed by various entities of the organization. An access path record may include, for example, an indication of an entry point into the organization (e.g., a type of device, software or hardware interface, or network address, which is to be used to initiate a legitimate access to a data artifact 106), as well as one or more intermediaries (e.g., network devices such as gateways, login servers, storage devices, and the like) which are typically encountered or traversed when an artifact is read or written. In some embodiments, respective legitimate access path records may be generated and stored for a variety of (entity, artifact) combinations. In at least one embodiment, the legitimate access path records may be generated by one or more automated tools similar in concept to web crawlers which attempt to follow a set of links from a web page.

In the embodiment depicted in FIG. 1, entity profiles repository 110 may include respective records for various employees and/or programs of the organization. Each entity may be assigned some set of roles and responsibilities—for example, some employees may be permitted to access trade secrets or proprietary designs of the organization, others may be granted access to HR records and so on. In addition, metadata such as normal working hours in the case of employees, or schedules in the case of iterative programs, may be stored in entity profiles repository 110 in various embodiments. In at least one embodiment, a risk metric may be assigned to various entities in their profiles, e.g., based on the anticipated extent of the damage that may be caused to the organization if the entity participates in an insider attack. Various elements of the entity profile records, such as role and responsibility information, may be used by an automated tool to populate the LAPR in some embodiments.

A security threat candidate (STC) detector 125 may be configured to use the information stored in the LAPR 130, the entity profiles repository 110, and/or the SBTR 120, together with activity log records 140 associated with the data artifacts 106, to determine whether the access behavior of one or more entities represents a potential or actual security threat in the depicted embodiment. In at least some embodiments, the STC detector may perform a sequence of threat analysis iterations. In a given iteration, the STC detector may examine a set of activity log records 140 corresponding to some selected time periods. In one part of the analysis, the STC detector 125 may for example determine whether any of the accesses recorded in the activity log records of the current iteration represent unauthorized or illegitimate accesses—e.g., by comparing the details of the recorded access to the entries in the LAPR 130. In another part of the analysis, the STC detector 125 may attempt to determine whether any of the access behaviors indicated in the activity log records match or overlap with one or more suspicious behavior templates of the SBTR. In some implementations, the set of activity log records analyzed for detecting illegitimate accesses may differ from the set analyzed for suspect behavior patterns. Results of the LAPR-based analysis and/or the SBTR-based analysis may be combined and/or weighted based on risk level assessments (e.g., obtained from the entity profiles of the entities involved, and/or sensitivity metrics of the artifacts involved). During each iteration, the STC detector may generate a list 160 of potential threats. In some embodiments, the lists may be provided to other security management components of system 100, such as detailed threat analysis managers 170 or response managers 170. In other embodiments, the STC detector may itself initiate some responsive actions, e.g., by disabling network accesses to one or more data artifacts, changing permissions on one or more data artifacts 106, and so on. In one embodiment, the STC detector may generate a score indicative of whether a given set of actual accesses indicated in the activity log records represents an attempted security breach, and may take further actions (e.g., initiating responses, or informing other response managers) only if the score exceeds a threshold.

In some embodiments, the STC detector may perform its analysis in a conditional workflow—e.g., if a first level of analysis of a given set of activity records 140 based on LAPR comparisons appears to be abnormal, a second level of analysis involving the SBTR may be triggered, or vice versa. In other embodiments, each of the different types of analysis may be performed independently and the results of the different analysis may be combined to determine the final actions taken by the STC detector during a given iteration. In some embodiments, iterations of the STC detector operations may be scheduled at regular or fixed intervals (e.g., once every X minutes), while in other embodiments, the iterations may be triggered only when specified events occur—e.g., when data transfers are detected from a particular artifact storage device.

A number of programmatic interfaces may be established for the use and administration of the insider thread detection system in various embodiments. For example, in one embodiment, each of the repositories illustrated in FIG. 1 may have its own web-based console, APIs, command line tools and/or custom GUIs (graphical user interfaces). Such interfaces may be used, for example, by HR personnel and/or IT personnel to enter entity profile information, or by automated tools to store records in the repositories. In some embodiments, subjective assessments of the psychological states of various employees may also be entered programmatically, e.g., in response to complaints lodged by one employee regarding another or in response to reported unusual mannerisms or behaviors. Programmatic interfaces may also be used to enter suspect behavior profiles, e.g., by human administrators of the ITDS and/or by expert systems or machine learning engines. In various embodiments, a number of activity log collectors may use programmatic interfaces to transmit log records for analysis by the STC detectors.

The components of the ITDS shown in FIG. 1 may be distributed across a variety of locations in some embodiments. For example, in one scenario the artifacts 106 may be stored at least temporarily at various storage resources of a provider network and/or at customer premises, and corresponding activity logs may be collected at each of the locations. A multi-tiered analysis approach may be used in some embodiments, in which local STC detectors operate on respective activity log records at each of several location, and the results of the local analysis are then transmitted to aggregating STC detectors at higher level, until an organization-level analysis is eventually performed. In such scenarios, the lower tiers of analysis may represent a filter through which only those threat candidates which meet a threshold risk level criterion are passed up to the higher tiers. In some embodiments, the activity log records may be sorted by the STC detectors, e.g., based on the levels of risk associated with the entities and artifacts of the log records, so that the accesses which may have the greatest negative impacts are examined earliest.

Data Artifact Types

Figure 2:
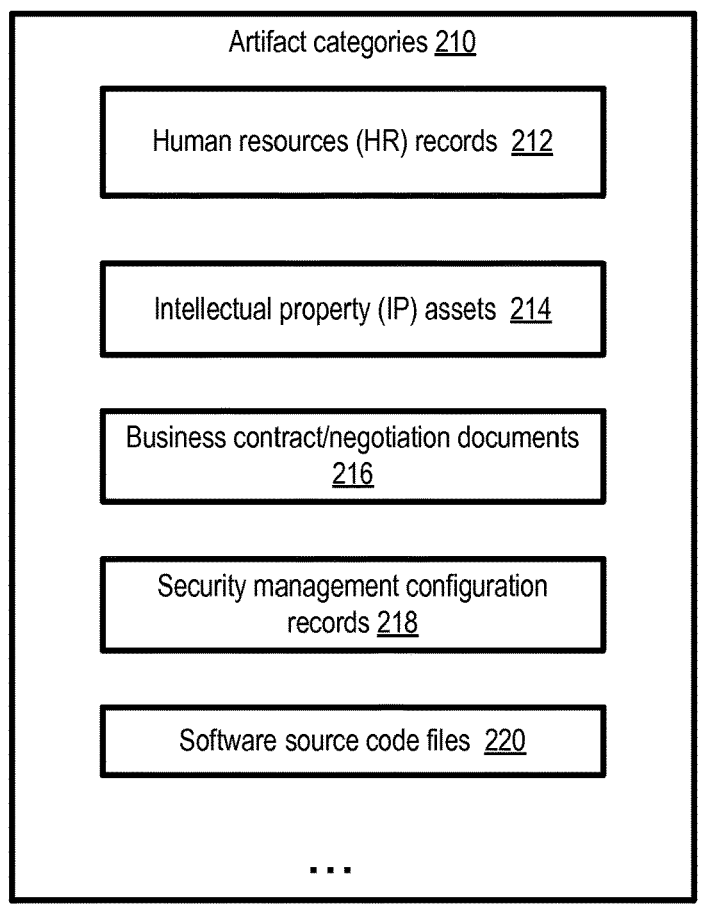
FIG. 2 illustrates example categories of security sensitive artifacts and the corresponding metadata that may be maintained at a threat management system, according to at least some embodiments.
Figure 2:
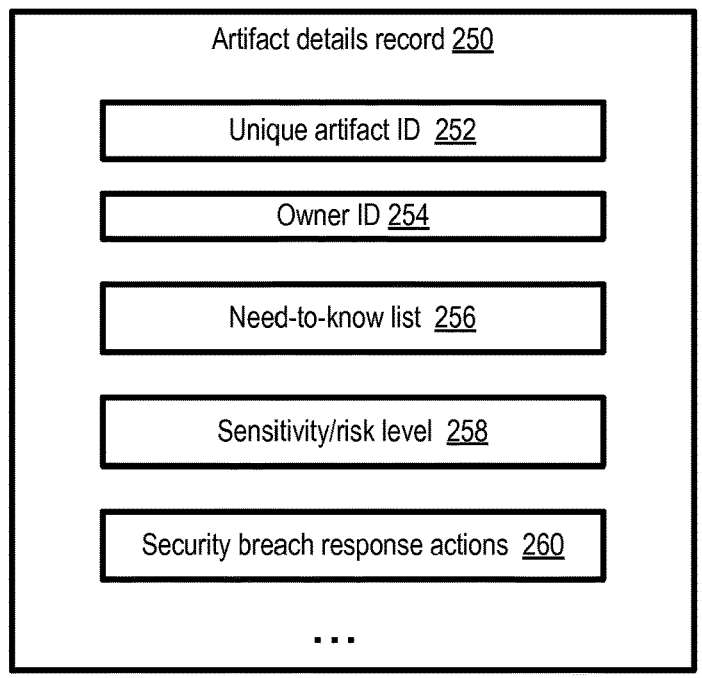

FIG. 2 illustrates example categories of security sensitive artifacts and the corresponding metadata that may be maintained at a threat management system, according to at least some embodiments. As shown, artifact categories 210 may include, among others, human resources (HR) records 212, intellectual property assets 214, business contract/negotiation records 216, security management configuration records 216 (e.g., configuration files for firewalls, activity logs, and the like), software source code files 220, and the like. Each type of artifact may be stored in a respective type of repository in various embodiments—for example, a relational database may be used for HR records, a source code management system may be used for program code files, emails stored at an electronic mail server's file system may contain some business records, and so on. In large organizations, the number of artifacts that contain sensitive information may number in the hundreds of thousands, and may be widely dispersed across one or more physical premises or data centers. Generating a list of artifacts to be protected against potential insider attacks, and keeping such a list up-to-date, may itself require a significant effort within large organizations. In some embodiments, all the data artifacts produced or generated within an organization may be considered security-sensitive by default—that is, an effort to distinguish sensitive data artifacts from artifacts which cannot be used for breaching security policies may not necessarily be required.

Corresponding to some or all data artifacts belonging to one or more of the categories 210, one or more elements of metadata may be maintained in respective artifact details records 250 in some embodiments. An artifact details record may include, for example, a unique artifact identifier 252, an owner identifier 254, a need-to-know list 256, a sensitivity or risk level metric 258, and one or more security breach response actions 260. The owner identifier 254 may be used to notify the appropriate party when the artifact is accessed in an unauthorized manner, for example. Need-to-know list 256 may indicate those entities which are to be permitted to read and/or write certain types of artifacts. Sensitivity and risk level indicators 258 may be assigned subjectively in some embodiments, e.g., with the help of the artifact owners and/or the management personnel of the organization. Response actions 260 may indicate what kinds of recovery operations should be performed if and when the data artifact is accessed as part of a security attack, or when an attempt to access the data artifact is made. In various embodiments, some or all of the kinds of metadata indicated in FIG. 2 may be stored in other formats, instead of or in addition to being stored in artifact details records used by the ITDS. For example, the logical equivalents of need-to-know lists 256 may be obtained by examining access control lists (ACLs) or read-write permissions associated with the files or database entries used for the artifacts. In some embodiments, artifact details records or their equivalents may be stored in the legitimate access paths repository used by the ITDS— e.g., each legitimate access path record may be associated with a corresponding artifact details record, and a given artifact details record may be associated with one or more legitimate access path records.

Suspect Behavior Templates

Figure 3:
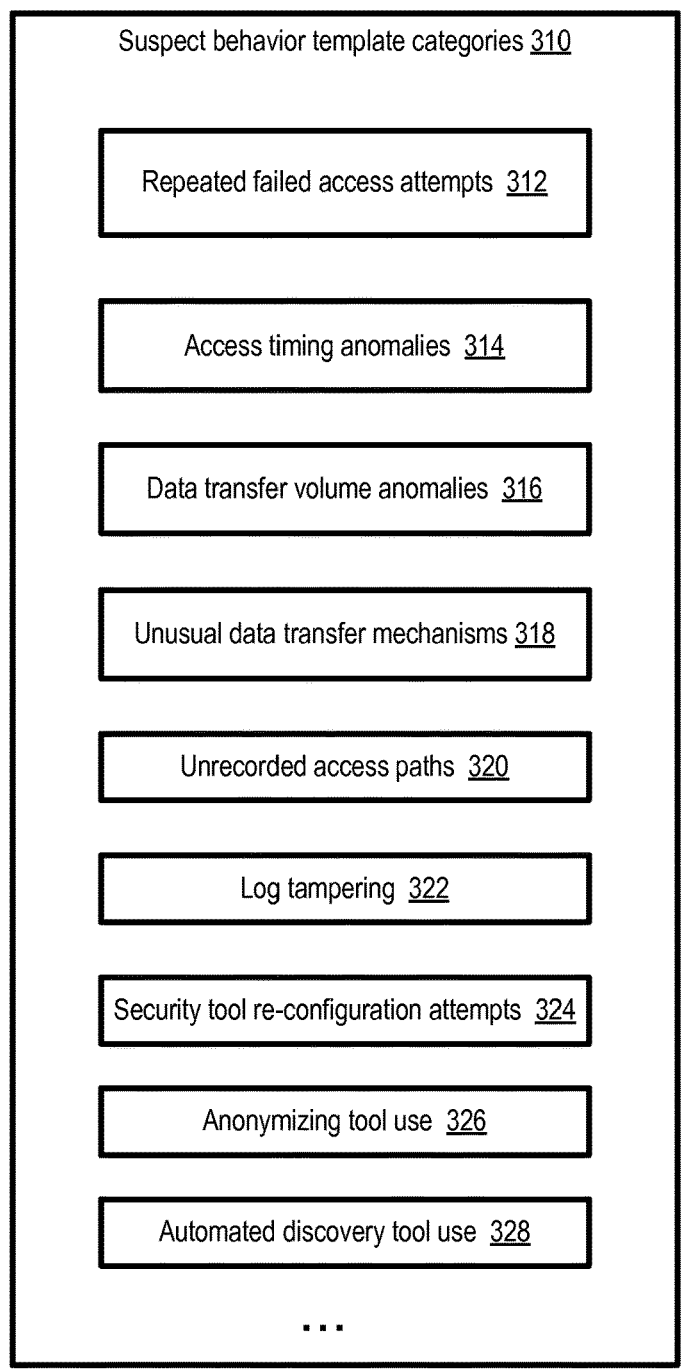
FIG. 3 illustrates example categories of suspect behavior templates which may be used to detect potential insider threats, according to at least some embodiments.

As mentioned earlier, an STC detector may consult a suspect behavior template repository (SBTR) to determine whether the accesses directed at one or more artifacts represent a pattern of behavior associated with insider attacks. FIG. 3 illustrates example categories of suspect behavior templates which may be used to detect potential insider threats, according to at least some embodiments. Suspect behavior template categories 310 may include, among others, repeated failed access attempts 312, access timing anomalies 314, data transfer volume anomalies 316, unusual data transfer mechanisms 318, use of unrecorded access paths 320, log tampering 322, security tool re-configuration attempts 324, anonymizing tool use 326 and/or automated discovery tool use 328 in the depicted embodiment. In some embodiments, the kinds of templates shown in FIG. 3 may be entered into the SBTR using programmatic interfaces by security experts, e.g., based on published research. In other embodiments, at least some suspect behavior templates may be generated automatically, e.g., based on correlation or other types of data analysis conducted using machine learning or artificial intelligence-related techniques.

Many insider attacks on sensitive data may be foreshadowed by failed attempts to access the data, and records of persistent unsuccessful efforts to gain access may therefore serve as a useful pattern 312 to be matched by the STC detector to identify possible insider threats. In some embodiments, the ITDS may be provided with information regarding scheduling and timing of various legitimate accesses to sensitive data artifacts—e.g., HR records stored in a particular database may typically be accessed only during normal office hours of 8 AM-5 PM in some organizations. If accesses (even authorized accesses) to the HR records are attempted frequently outside the normal office hours, this may represent an example of access timing anomalies 314, which may also potentially indicate a security threat. If an employee or program typically transfers no more than X megabytes of data per day to or from some set of artifacts, but appears to be transferring 10X or 100X megabytes during one or more otherwise normal days, this may represent a data transfer volume anomaly 316 which could also suggest that some kind of attack is being attempted. If most of an organization's legitimate data transfer typically occurs over one or more networks, but a given employee appears to be transferring data using a USB device or using unauthorized/personal cloud-based storage, this may represent the use of unusual data transfer mechanisms 318, and may also represent a possible attack pathway.

As mentioned earlier, a legitimate access paths repository (LAPR) may indicate all the known pathways permitted to various data artifacts. If activity logs indicate that a particular artifact is accessed successfully via a pathway which is not in the LAPR, this use of an unrecorded access path 320 may in itself be considered a security threat, or at least may point out a possible weakness in the security policies or the access path generating techniques being used. If an individual or program is found to be tampering (or attempting to tamper with) various types of system-generated logs (template 322), or attempting to change the configuration of one or more security tools (template 324), these actions may be tagged by the SCT detector as being indicative of attempted security breaches in at least some embodiments. The use of anonymizing tools 326 (e.g., tools that obfuscate an email's sender address, or change the network address or domain from which an HTTP request appears to originate) and/or automated discovery tools (such as web crawlers) may constitute other examples of suspect behavior patterns which an STC detector may attempt to match in various embodiments. Other types of suspect behavior templates may be included in an SBTR in some embodiments, while some of the templates listed in FIG. 3 may not be used in at least one embodiment. In some embodiments, the SBTR may also include programmatic instructions or guidelines indicating how an STC detector should attempt to detect matches between the suspect behavior templates and the activity log records—e.g., how many successive failed access attempts constitute a potential threat, which particular re-configuration attempts should be considered predictive of security attacks, and so on.

Legitimate Access Path Records

Figure 4:
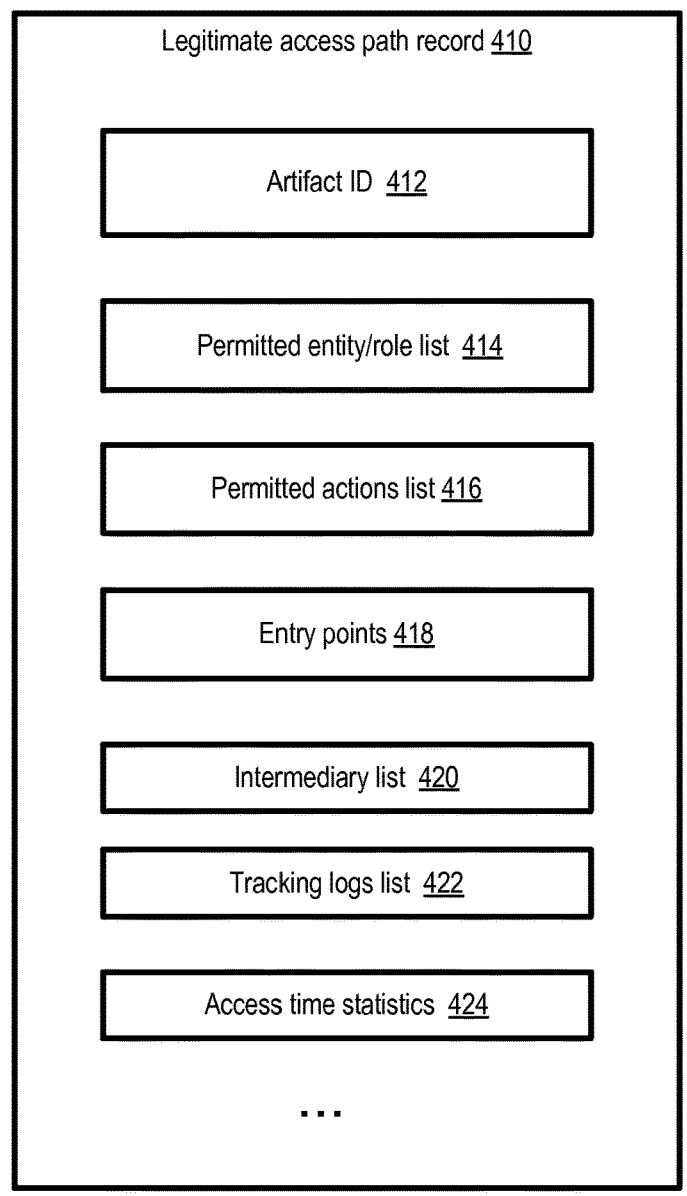
FIG. 4 illustrates example elements of legitimate access path records which may be used to detect potential insider threats, according to at least some embodiments.

FIG. 4 illustrates example elements of legitimate access path records which may be used to detect potential insider threats, according to at least some embodiments. In the depicted embodiment, a given access path record 410 may include an identifier 412 of the artifact for which the path may be used, a permitted entity/role list 214, a permitted actions list 216, an indication of entry points 218 available for requests to read/write the artifact, an intermediary list 220, a tracking logs list 222, and/or access time statistics 224.

Permitted entity/role lists 214 may indicate the roles or responsibilities for which access to the artifact is authorized. For example, the permitted role list for an HR record of an employee's salary may include "payroll manager", "employee manager" and the like. In some embodiments, the names or identifiers of the specific employees and/or programs that are allowed to access an artifact may be included in a permitted entity role list 214 instead of or in addition to roles or responsibilities. Permitted actions list 216 may indicated, for each entry in the permitted entity/role list, the specific actions that are permitted (e.g., read versus read-and-write actions).

The entry points 218 and intermediary list 220 may collectively indicate the logical and/or physical devices and network pathways that should be used to access the artifact. For example, for certain types of data artifacts, accesses may only be permitted if they originate at specific tools, servers, or IP (Internet Protocol) addresses, and pass through a particular sequence of intermediary software or hardware layers. Tracking logs list 222 may indicate the sources of activity log records that can be checked to verify the entry points and intermediaries actually used in the depicted embodiment. In some embodiments, one or more types of access time statistics 224 may be included in the legitimate access path record—e.g., indicating the usual distribution of accesses to the artifact as a function of the time of day, or the amount of time it typically takes for an access request to be handled at various intermediaries. If the times indicated in activity log records (e.g., the time at which an access is initiated, or the time it takes to respond to a particular access request) varies substantially from the norm, this might indicate a possibility of a security attack in some embodiments. Other types of entries regarding legitimate access pathways may be stored in various embodiments in the LAPR, and some of the entries illustrated in FIG. 4 may not be used in at least some embodiments.

Entity Profile Records

Figure 5:
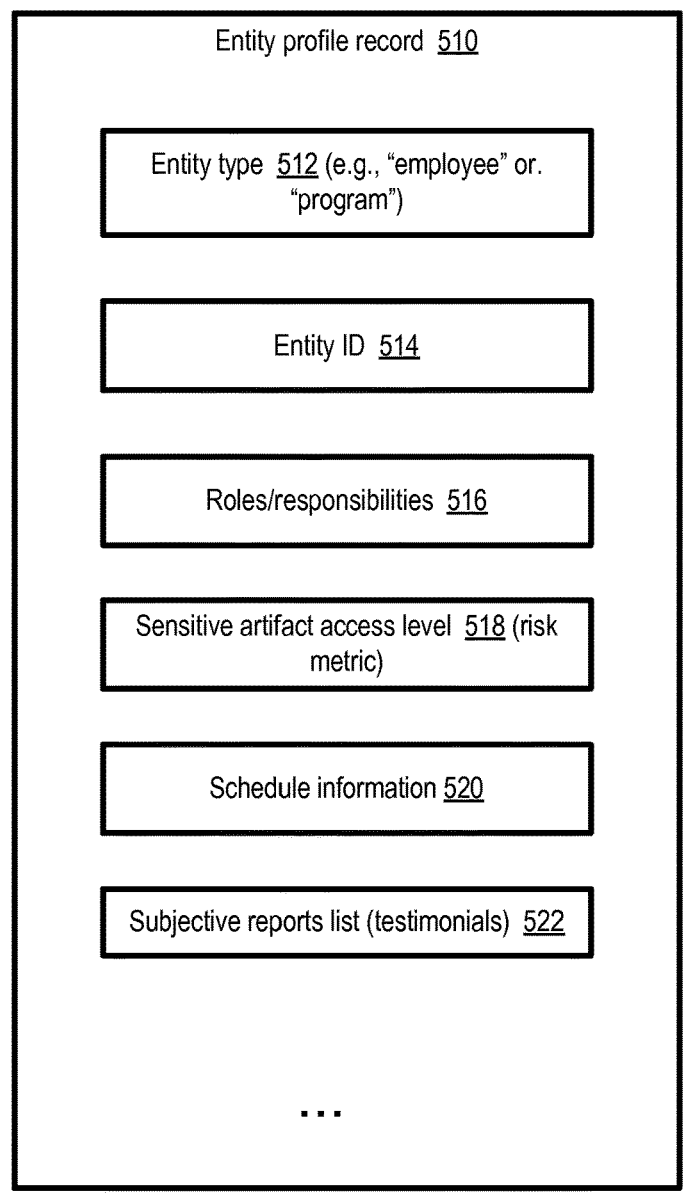
FIG. 5 illustrates example elements of entity profile records which may be used to detect potential insider threats, according to at least some embodiments.

FIG. 5 illustrates example elements of entity profile records which may be used to detect potential insider threats, according to at least some embodiments. A given entity profile record 510 may include, for example, an indication of an entity type 512—e.g., whether the entity is an employee or a program/script. An identifier 514 for the entity may be used, for example by the STC detector, to identify the particular subset of activity log entries which indicate accesses attempted or completed by the entity. In some embodiments, at least some of the log entries may not contain entity identifiers in the same form as indicated in the entity profiles—instead, for example, a log entry may indicate an IP address of a computer from which an access request was received, and the STC detector may use other metadata (e.g., a mapping of employees to the IP addresses assigned to their workstations) to map entities to their activity log entries.

Roles and responsibilities assigned to the entity may be indicated in element 516 in the depicted embodiment, and may be used to correlate entities and legitimate access paths as discussed earlier. In at least some embodiments one or more metrics indicative of the risk associated with security breaches in which the entity is a participant may be stored in the profile records, e.g., in the form of sensitive artifact access level element 518. The more sensitive the data artifacts to which the entity is provided access, as determined for example by some security or management personnel of the organization, the higher the risk metric may be set in at least some embodiments. Risk metrics such as sensitive artifact access level 518 may be used as relative weights to be attached to the results of the analysis conducted by an STC detector in some embodiments. For example, if two sets of accesses, one by entity E1 and one by entity E2, appear to indicate security threats, but the risk metric of E1 is double the risk metric of E2, the STC detector may prioritize responses to E1's security threat higher than the responses to S2's security threats.

In at least some embodiments, schedule information 520 may be stored for at least some entities in their respective profiles, indicating for example the normal working hours (in the case of employees) or the hours at which the program is typically executed (in the case of programs). In one embodiment, the organization may also store records of subjective reports 522 regarding various employees—e.g., if one employee E1 reports another employee E2's unusual behavior, such a record may be stored in the profile of E2 (while ensuring that privacy and confidentiality policies of the organization are complied with). Such subjective reports, which may also be referred to as testimonials, may sometimes be helpful in analyzing the access behavior of the employee.

Insider Threat Detection in Large-Scale Distributed Organizations

In one embodiment, a provider network at which at least a portion of the artifacts of an organization are stored may be organized into a plurality of geographical regions, and each region may include one or more availability containers, which may also be termed "availability zones" herein. An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container. In some embodiments, a hierarchy of insider threat detection components may be set up within a provider network, e.g., corresponding to the geographical hierarchy of regions, availability containers and data centers.

Figure 6:
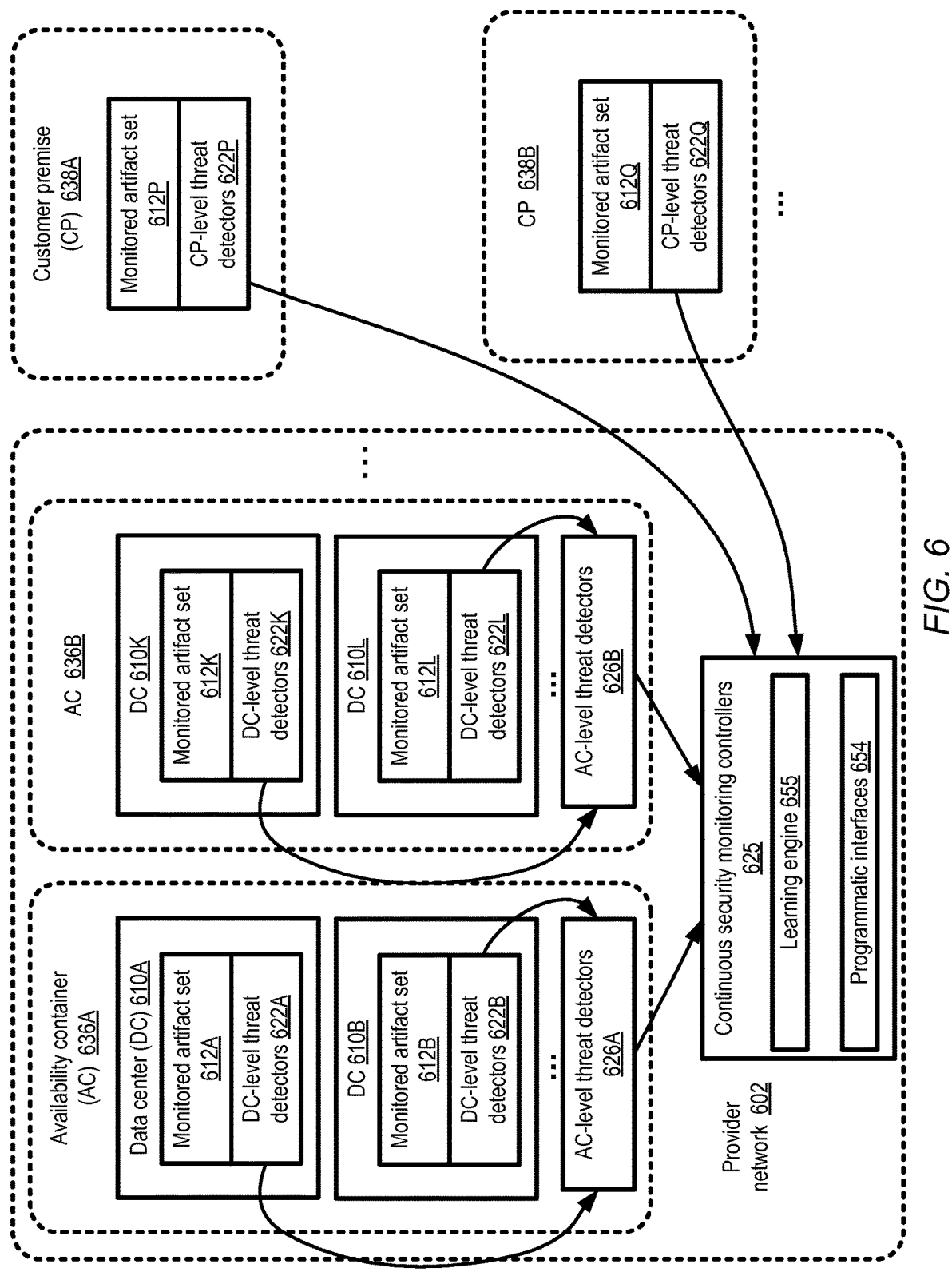
FIG. 6 illustrates an example of a multi-level hierarchy of insider threat detectors that may be implemented in a provider network environment, according to at least some embodiments.

FIG. 6 illustrates an example of a multi-level hierarchy of insider threat detectors that may be implemented in a provider network environment, according to at least some embodiments. In the depicted embodiment, provider network 602 comprises a plurality of availability containers (ACs), such as AC 636A and 636B. Various data artifacts may be replicated at the two different availability containers, e.g., to provide desired levels of availability and durability. A customer of the provider network may also use resources housed in external locations for at least a subset of the artifacts for which potential insider threats are to be detected, such as customer premise 638A and customer premise 638B. In the depicted embodiment, availability containers 636A and 636B may each comprise a plurality of data centers, such as data centers 610A and 610B in AC 636A, and data centers 610K and 610L in AC 636B. Each data center may comprise its set of monitored artifacts 612 (or artifact replicas) with associated activity log entry collectors. DC 610A includes monitored artifact set 612A, DC 610B includes monitored artifact set 612B, DC 610K includes monitored artifact set 612K and DC 610L includes monitored artifact set 612L. Each monitored artifact set may comprise different numbers and types of artifacts of one or more categories (such as some of the categories illustrated in FIG. 2), and the number of log entry collectors instantiated at each data center may differ from the number instantiated at other data centers. In at least some implementations, respective portions of a given data artifact may be stored in different data centers—e.g., a file or database table may be partitioned across two or more data centers or availability containers.

To process the activity logs locally within each data center, respective DC-level threat detectors 622 may be set up. For example, DC-level threat detectors 622A, 622B, 622K and 622L may be established in DCs 610A, 610B, 610K and 610L respectively. One or more respective local repositories may be set up for the threat detectors at each data center in some embodiments, such as local SBTRs, local LAPRs and/or local entity profile record databases.

Depending on various factors such as the number of artifacts, the frequency at which artifact activity log records are generated and collected, and so on, the volume of raw data that has to be processed with respect to insider threats at any given data center may be quite high (for example, millions of records may be generated per day). At the next higher level of the ITDS, AC-level threat detectors such as 623A and 623B may be established in the depicted embodiment. Aggregated versions or filtered/prioritized subsets of the results of the insider threat analysis conducted at the DC level may be transmitted to the AC-level components 623 in the depicted embodiment.

At each external location at which data artifacts of the organization are stored, such as artifact set 612P at customer premise 638A or artifact set 612Q at customer premise 638B, a respective set of ITDS components 622 (such as CP-level threat detectors 622A or 622B) may also be instantiated in the depicted embodiment. Each CP-level component may include its own versions of one or more repositories in some embodiments. From the various AC-level and CP-level threat detectors, results of the threat analyses performed may be transmitted to the next higher level of the ITDS hierarchy in the depicted embodiment: a set of logically centralized continuous security monitoring controllers 625. The controllers 625 may represent a portion of a larger security management infrastructure in some embodiments, responsible not just for identifying insider threats but other types of security attacks as well. In at least one embodiment, secure communication channels may be established between the CP-level components and the controllers 625 within the provider network. For example, in some implementations VPN (Virtual Private Network) connections may be used, while in other implementations dedicated physical links (sometimes referred to as "Direct Connect" links) may be used. In at least one embodiment, while the log entries may be collected at various layers of the provider network hierarchy shown in FIG. 6, and at one or more client premises, the analysis using suspect behavior templates and legitimate access paths may be performed in a centralized manner, after the log entries from the different sources have been aggregated. In some cases the suspect behavior templates may indicate behavior patterns which include some operations performed at client premises and some operations performed at the provider network. For example, one suspect behavior pattern may include transfers of unusually large amounts of data from provider network storage devices to client premises, followed by the use of unusual data transfer mechanisms such as USB drives at the client premises. To identify matches with such patterns, activity logs from the client premises and from the provider network may have to be examined as a group.

In some embodiments, the continuous monitoring infrastructure may include one or more learning engines 655, which may for example use artificial intelligence or machine learning techniques to help identify and react to security threats. The learning engine 655 may, for example, add suspect behavior templates to the SBTR over time based on post-mortem analyses of attempted (or successful) security attacks or breaches. In one embodiment, a given customer's security-sensitive data artifacts may use resources at multiple provider networks, in which case another layer of threat detectors (e.g., above the AC layer) may be used to combine the information collected from the different provider networks.

The devices at which the organization's data artifacts are stored may be associated with numerous different network-accessible services implemented at a provider network 602 in some embodiments. For example, the provider network's service set may include a virtual computing service, one or more storage services, database services, and so on. Several different types of storage-related services may be implemented at some provider networks, such as an object storage service which provides web-services based access to unstructured storage objects, or a volume service which provides block device level access to storage volumes. In some embodiments, a number of different database-related services may be implemented, such as a relational database service, a non-relational (e.g., "noSQL") database service, and so on. Activity log records may be collected from any or all of the different network-accessible services in various embodiments, and analyzed for the presence of potential insider threats by STC detectors as described above.

Methods for Insider Threat Analysis

Figure 7:
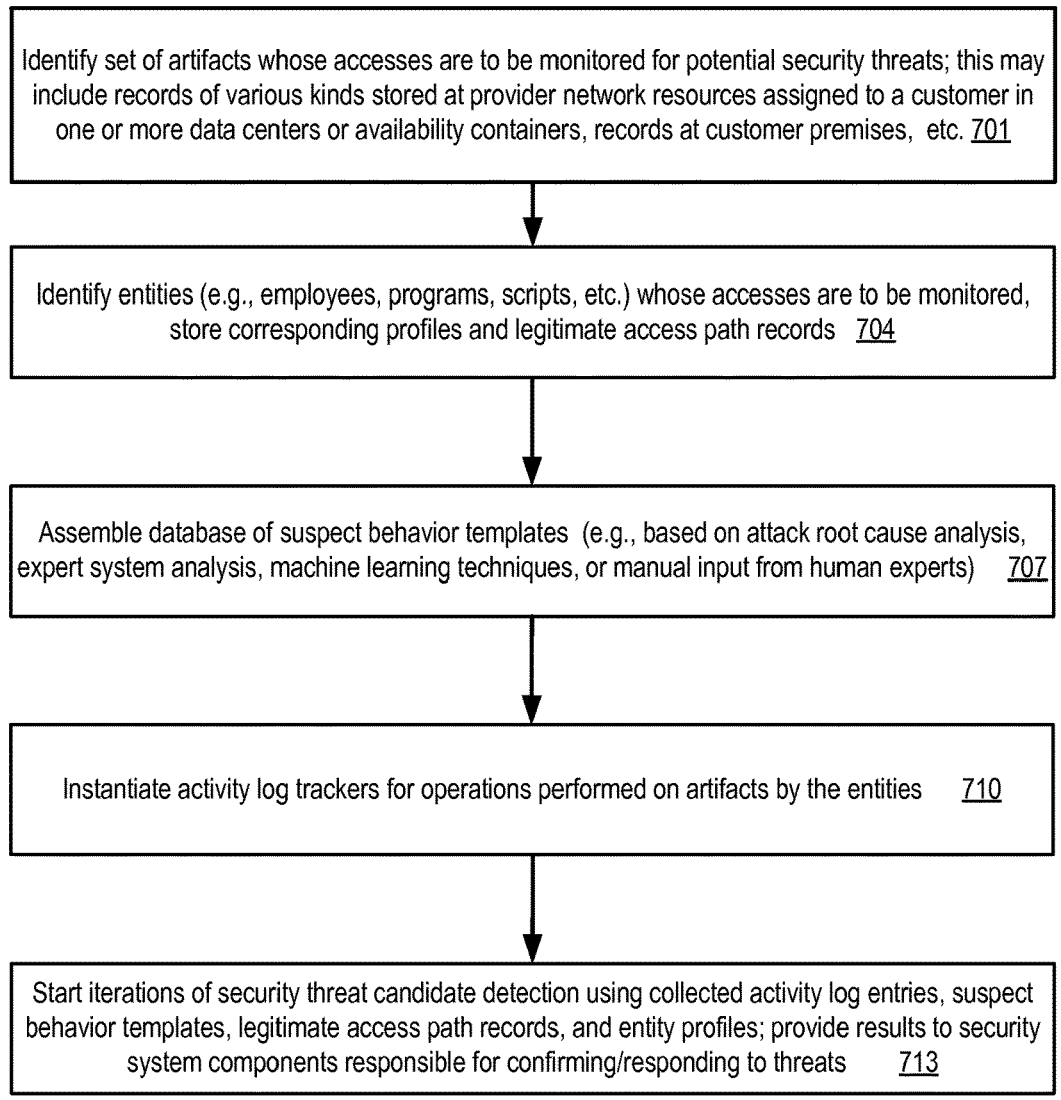
FIG. 7 is a flow diagram illustrating aspects of operations that may be performed to configure a system for detecting insider security threats at an organization, according to at least some embodiments.

FIG. 7 is a flow diagram illustrating aspects of operations that may be performed to configure a system for detecting insider security threats at an organization, according to at least some embodiments. As shown in element 701, a set of artifacts whose accesses are to be monitored to help detect potential insider security threats at one or more organizations may be identified. A number of different kinds of artifacts may be selected for monitoring, including for example human resource department records, business negotiation or contract-related records, software code, intellectual property asset documents, and so on. In some embodiments, the list of artifacts may be generated automatically, e.g., by querying one or more databases, file systems, and the like. In various embodiments, at least some of the artifacts may be stored at provider network resources at one or more data centers or availability containers. For example, one or more database services and/or storage services of the provider network may be used for storing the artifacts. In at least one embodiment, some of the artifacts may be stored at client premises while others may be stored at a provider network. Metadata about the artifacts, such as owner identifiers, associated risk/sensitivity levels, and the like may also be stored in a persistent repository in some embodiments.

The entities whose accesses to the artifacts may be monitored may also be identified, and corresponding profile records and legitimate access path records may be stored (element 704). In some embodiments, all the employees of the organization may automatically be designated as entities which could participate in insider attacks, while some set of automated programs, scripts and the like that are run on behalf the organization's staff may also be designated as potential sources of security attacks. In other embodiments, only a subset of employees may be included in the set of entities whose actions are to be tracked. The profile records may indicate roles/responsibilities of the entities in some embodiments, which in turn may be used to generate a set of legitimate access paths that can be used by the entities to access various data artifacts.

A database of suspect behavior templates may be assembled (element 707), indicative of behavior patterns which are expected to be correlated with occurrences of insider attacks. Such suspect behavior templates may include, for example, unusual volumes of data transfer, the excessive use of certain types of data transfer mechanisms such as USB drives or personal cloud-based storage drives, unusual timings with respect to artifact accesses, and so on. In some embodiments, the templates may be derived at least in part on causal and/or correlation analysis performed on behalf of the organization—e.g., using an expert system or machine learning algorithms. In other embodiments, at least some of the templates may be created based on published research, e.g., by security experts working at various industry consortia or government entities.

A set of activity log trackers may be instantiated to monitor the operations of the entities on the artifacts (element 710). In some embodiments, at least a subset of the activities of interest may already be captured in existing logs, e.g., database logs or web server logs, and/or by monitoring components of a security management system in place at the organization. After the repositories and components of the insider thread detection system (ITDS) indicated in elements 701-710 are in place, a sequence of potential threat detection iterations may be started (element 713) in the depicted embodiment. In a given iteration (details of which are provided in the description of FIG. 8 below), a security threat candidate (STC) detector may examine a set of activity log metrics. The STC detector may use the legitimate access paths records to ascertain whether any unauthorized accesses were attempted or completed among the activity logs, for example, and may try to identify overlaps between the logged behaviors and the suspect behavior templates. If the STC detector finds evidence of possible insider attacks (or behavior that is likely to be followed by such attacks), it may pass its evidence or results on to other security management components responsible for more detailed verification of the evidence, and/or for taking responsive actions such as disabling a network path or rescinding access permissions for one or more (artifact, entity) combinations. In some embodiments, the STC detector may itself initiate responsive actions instead of relying on other components of a security management system.

Figure 8:
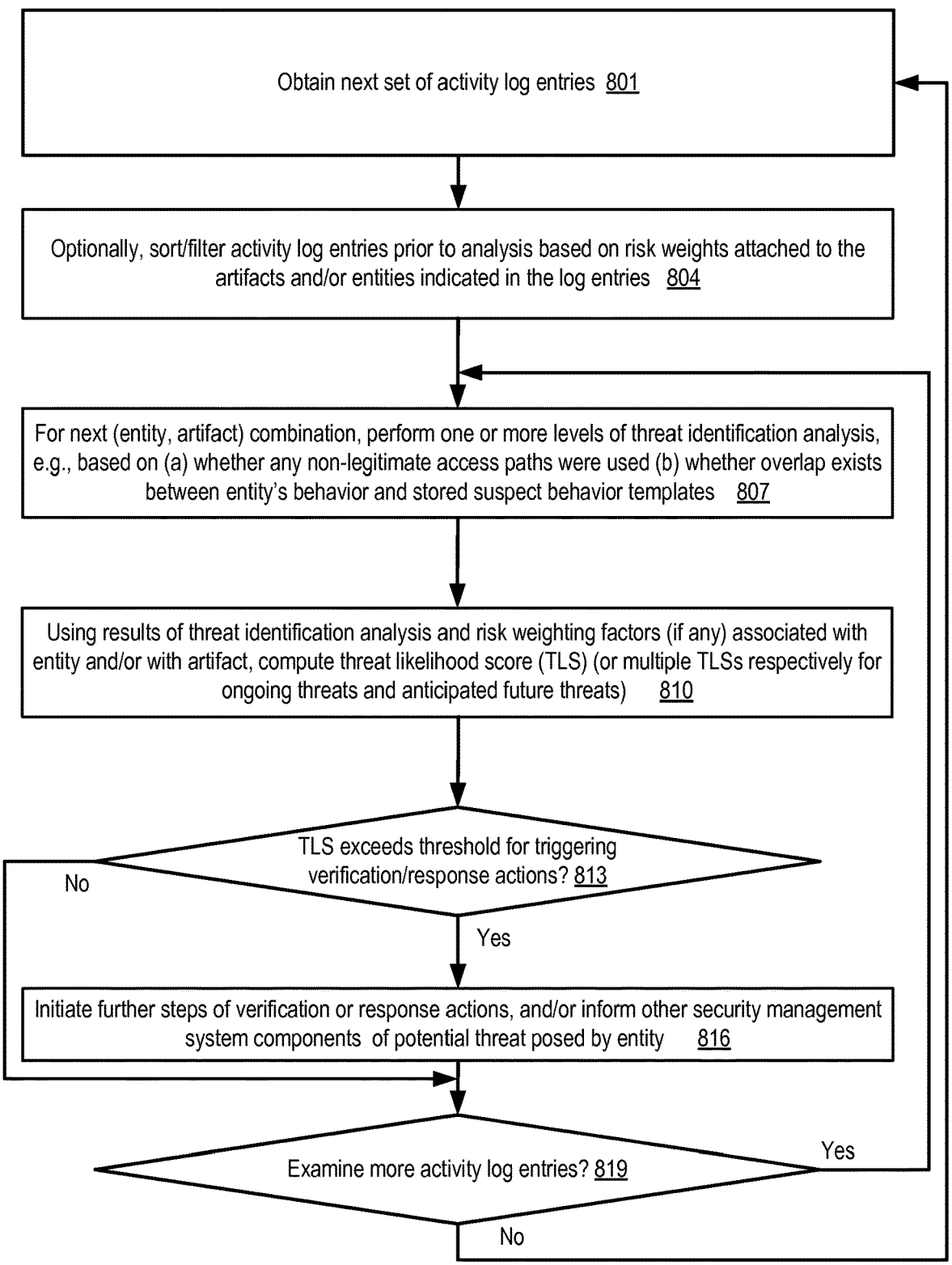
FIG. 8 is a flow diagram illustrating aspects of operations that may be performed during an iteration of insider security threat analysis, according to at least some embodiments.

FIG. 8 is a flow diagram illustrating aspects of operations that may be performed during an iteration of insider security threat analysis, according to at least some embodiments. As shown in element 801, an STC detector may obtain a set of activity log records or entries to be examined during the iteration. In some embodiments, the raw activity log entries (which may originate at many different types of collectors with different output formats and data models) may have to be transformed or standardized before they can be analyzed for insider threats. In at least one embodiment, the activity log entries may be sorted, e.g., based on the relative risk metrics associated with the artifacts and/or entities indicated in the entries (element 804). For example, if the artifacts have been assigned sensitivity/risk metrics as discussed in the context of FIG. 2, or if the entities have been assigned access levels indicative of risk as discussed in the context of FIG. 5, the STC detector may sort the log entries based on those metrics.

The STC detector may then iterate through the log entries (element 807), performing one or more levels of threat analysis for each (entity, artifact) combination for which one or more entries exist. For example, in some embodiments, the STC detector may first determine whether any unauthorized accesses were performed or attempted (e.g., using a legitimate access paths repository of the kind described above). If such unauthorized accesses are found, this may trigger the STC to try to determine, using any appropriate pattern matching technique, whether an overlap exists between the behavior exhibited by the entity and a set of suspect behavior templates stored in a repository. In one embodiment, the set of activity log entries examined for suspect behavior pattern matching may differ from the set used for identifying unauthorized accesses. In at least some embodiments, the search for suspect behavior template matches and the search for unauthorized accesses may be conducted independently—that is, evidence of unauthorized accesses may not be required to trigger the SBT match analysis, and evidence of SBT matches may not be required to trigger searches for unauthorized accesses.

In the embodiment depicted in FIG. 8, the STC detector may generate one or more threat likelihood scores (TLSs) based at least in part on the results of the detection of unauthorized accesses and/or suspect behaviors (element 810). Risk weight metrics associated with the entity and/or artifacts may also be taken into account when computing the TLS(s) in some embodiments. In some cases, one TLS may be generated to reflect the likelihood that an attack is ongoing, and another TLS may be generated for imminent or future attacks (i.e., attacks which may not need a response as quickly as an ongoing attack). If at least one TLS exceeds a threshold (as detected in element 813), the STC detector may take further action. For example, depending on the TLS, it may initiate a detailed verification procedure to confirm the presence of the threat, initiate responsive actions such as disabling network accesses to a particular set of artifacts, etc., and/or the STC detector may inform other components of a security management system configured to perform the detailed verification or responsive actions (element 816). If the TLS does not meet a triggering threshold for any of these actions (as also detected in element 813), the STC detector may determine whether any more activity log entries should be examined (element 819). In some embodiments, the STC detector may examine all the activity log entries that have been collected for one iteration. In other embodiments the STC detector may terminate an analysis iteration despite not having examined all the log entries, e.g., if a certain amount of time designated for the iteration has expired, or if the entries were sorted based on risk and the remaining entries have very low risks associated with them.

If additional log entries are to be examined as detected in element 819, the operations corresponding to elements 807 onwards may be repeated for the next (entity, artifact) combination in the depicted embodiment. In the next iteration of threat analysis, the operations corresponding to elements 801-816 may be repeated with the next set of collected activity log entries.

It is noted that in various embodiments, some of the kinds of operations shown in FIG. 7 and FIG. 8 may be implemented in a different order than that shown, or may be performed in parallel (e.g., continuously) rather than sequentially. For example, several of the operations shown in FIG. 7 may be performed in parallel, and the examination of several different sets of activity log entries (corresponding to elements 807-819 of FIG. 8) may be performed in parallel. The addition of new records to the LAPR, the SBTR and/or the entity profile repositories may implemented in an ingoing or continuous manner in some embodiments, with such additions being scheduled independently of the threat detection iterations. In some embodiments, some of the operations shown in FIG. 7 or FIG. 8 may not be implemented, or additional operations not shown may be performed Use Cases The techniques described above, of using access behavior patterns to detect possible insider threats to sensitive data artifacts of an organization may be useful in a variety of scenarios. Some business entities may utilize a number of physical and/or virtual resources distributed inside and outside a provider network to store sensitive organizational assets. Especially in the case of large organizations with thousands of employees distributed around the world and computing resources spread over many different locations, it may be difficult to anticipate all the ways in which such assets may be compromised. By keeping track of legitimate access paths designated for various actors (including both individuals and programs that may be granted read or write privileges to the assets), and combining the analysis of actual accesses to the artifacts with pattern matching for suspect behaviors, the probability of anticipating and detecting insider-initiated security attacks may be increased substantially.

Illustrative Computer System

Figure 9:
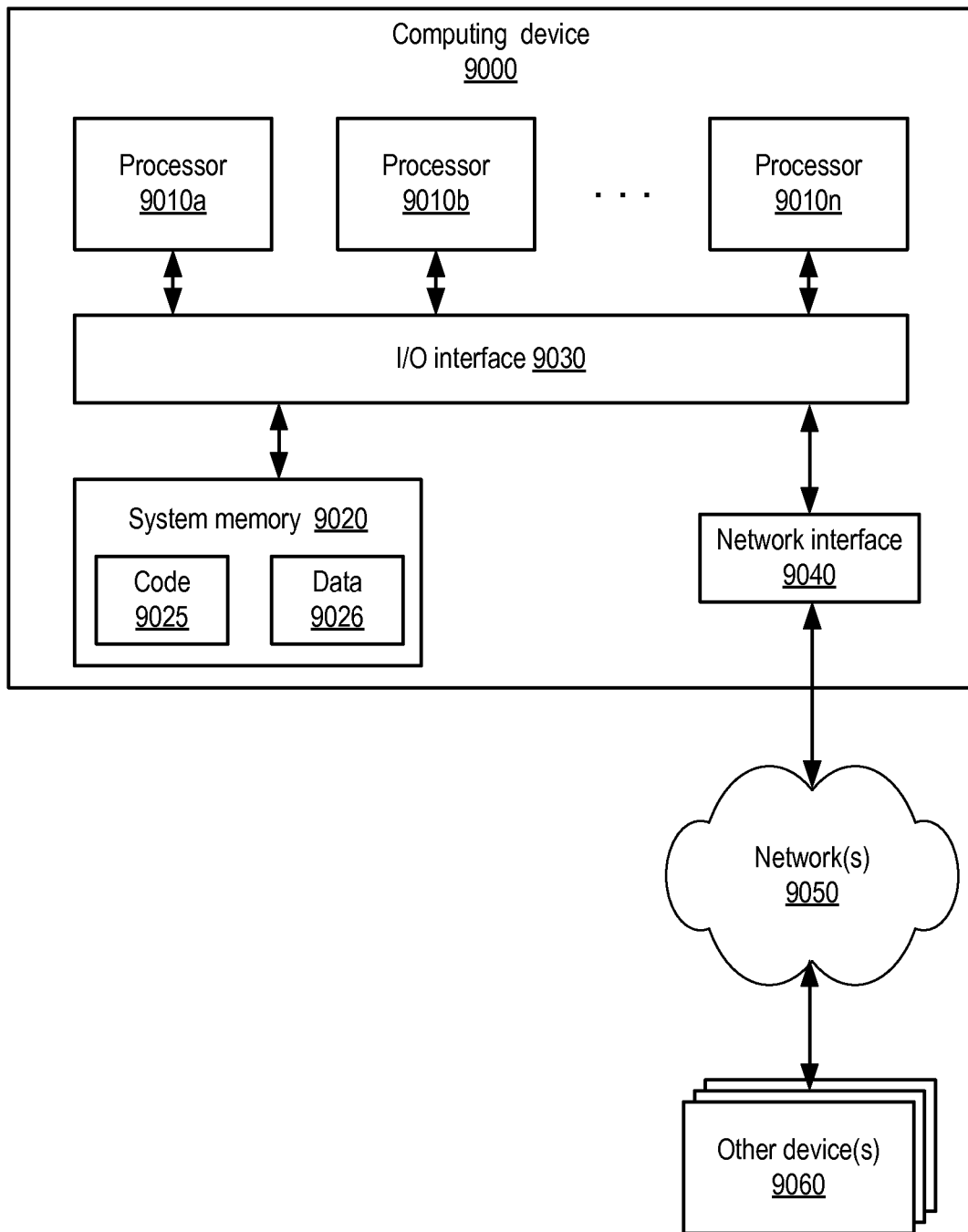
FIG. 9 is a block diagram illustrating an example computing device that may be used in at least some embodiments.

In at least some embodiments, a server that implements one or more of the techniques described above for supporting insider threat analysis, including security threat candidate detectors, legitimate access path repository management, suspect behavior template repository management, entity profile management and/or activity log tracking may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferro-electric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more storage devices configured to implement a suspect behavior template repository comprising one or more suspect behavior templates, wherein the one or more suspect behavior templates comprise one or more patterns of behavior that are identified as being correlated with one or more security threats;
   one or more same or different storage devices configured to implement a legitimate access paths repository, different from the suspect behavior template repository, comprising records indicating acceptable or authorized ways by which a plurality of data artifacts of an organization may be accessed by a plurality of entities;

one or more computing devices comprising one or more processors and associated memory configured to implement an automated security threat candidate detector configured to:

obtain a set of activity log records from a plurality of activity log record collectors associated with the plurality of data artifacts, indicative of access requests directed at the data artifacts on behalf of a same or different plurality of entities, wherein the same or different plurality of entities include at least a first computer program and at least a first employee of the organization, wherein at least a first data artifact of the data artifacts is stored at a provider network, and wherein the set of activity log records includes a first activity log record associated with the first data artifact and a particular entity of the same or different plurality of entities;

determine, in a first threat identification analysis, that the first activity log record indicates at least one access request which is not indicated as an acceptable or authorized way by which the first data artifact of the plurality of data artifacts may be accessed by the particular entity of the same or different plurality of entities in the legitimate access paths repository;

determine, in a second threat identification analysis performance of which is conditioned on the determination of the first threat identification analysis that the at least one access request is not indicated as an acceptable or authorized way by which the first data artifact may be accessed by the particular entity in the legitimate access paths repository, that an overlap between a behavior pattern of the particular entity indicated by a plurality of the activity log records including the first activity log record, and one or more of the patterns of behavior of one or more of the suspect behavior templates stored in the suspect behavior template repository, exists;

based at least in part on the determination that the overlap exists in the second threat identification analysis, identify the particular entity as a threat with respect to the first data artifact;

disable one or more network paths, or rescind access permissions, to prevent the particular entity, identified as the threat, from accessing the first data artifact, to protect the first data artifact from the particular entity; and one or more of the computing devices, or one or more different computing devices comprising one or more different processors and associated memory, configured to implement a learning engine configured to perform a post-mortem analysis of the behavior pattern of the particular entity indicated by the plurality of the activity log records to generate additional one or more suspect behavior templates, the learning engine comprising:

a machine learning or artificial intelligence engine configured to apply one or more machine learning algorithms or one or more artificial intelligence techniques to the plurality of the activity log records to identify one or more security threats from the plurality of the activity log records;

the learning engine configured to:

generate, based on the identification of the one or more security threats, additional one or more suspect behavior templates that include one or more patterns of behavior correlated with one or more of the identified security threats; and initiate addition of the additional one or more suspect behavior templates to the suspect behavior template repository for use to determine whether an overlap between a behavior pattern and the additional one or more suspect behavior templates, exists.

2. The system as recited in claim 1, wherein the one or more suspect behavior templates include a particular behavior template representing one or more of: (a) repeated unsuccessful attempts to access one or more data artifacts, (b) occurrences of data accesses at times outside a work schedule, (c) transfers of data exceeding a threshold data set size, or (d) a use of a particular data transfer mechanism.

3. The system as recited in claim 1, wherein the security threat candidate detector is configured to:

assign, based at least in part on a stored profile record of the particular entity, a risk weight to a result of one or more of the first and second threat identification analyses.

4. The system as recited in claim 1, wherein the security threat candidate detector is configured to:

select the particular security management component from among a plurality of security management components based at least in part on a risk weight associated with a result of one or more of the first and second threat identification analyses.

5. A method, comprising:

performing, by an automated security threat candidate detector implemented at one or more computing devices comprising one or more processors and associated memory:

obtaining a set of activity log records from a plurality of activity log record collectors associated with a plurality of data artifacts of an organization, indicative of access requests directed at the data artifacts on behalf of a plurality of entities, wherein the plurality of entities includes at least a first computer program, and wherein the set of activity log records includes a first activity log record associated with a particular entity of the plurality of entities and with at least one data artifact of the plurality of data artifacts;

determining, in a first threat identification analysis, that the first activity log record indicates at least one access request which is not represented as a legitimate way by which the at least one data artifact of the plurality of data artifacts may be accessed by the particular entity of the plurality of entities in a repository of access paths;

determining, in a second threat identification analysis triggered at least in part by the determining that the at least one access request is not represented as a legitimate way by which the at least one data artifact may be accessed by the particular entity in the repository of access paths of the first threat identification analysis, whether an overlap exists between a behavior pattern of the particular entity, indicated by a plurality of the activity log records including the first activity log record, and one or more patterns of behavior of one or more stored suspect behavior templates, wherein the one or more stored suspect behavior templates are distinct from the repository of access paths, and the one or more patterns of behavior of the one or more stored suspect behavior templates are identified as being correlated with one or more security threats;

based at least in part on the determining that an overlap exists in the second threat identification analyses, identifying the particular entity as a threat with respect to the first data artifact; and disabling one or more network paths, or rescinding access permissions, to prevent the particular entity, identified as the threat, from accessing the first data artifact, to protect the first data artifact from the particular entity; and performing, by a learning engine comprising a machine learning or artificial intelligence engine configured apply one or more machine learning algorithms or one or more artificial intelligence techniques to activity log records to identify security threats, the learning engine implemented at one or more of the computing devices, or at one or more different computing devices comprising one or more different processors and associated memory:

generating, based on a post-mortem analysis of the behavior pattern of the particular entity indicated by the plurality of the activity log records, additional one or more suspect behavior templates that include one or more patterns of behavior correlated with one or more security threats, wherein the analysis comprises applying, by the machine learning or artificial intelligence engine, one or more machine learning algorithms or one or more artificial intelligence techniques to the plurality of activity log records; and initiating addition of the additional one or more suspect behavior templates to a suspect behavior template repository for use to determine whether an overlap between a behavior pattern and the additional one or more suspect behavior templates exists.

6. The method as recited in claim 5, further comprising performing, by the security threat candidate detector:
assigning, based at least in part on a stored profile record of the particular entity, a risk weight to a result of one or more of the first and second threat identification analyses.

7. The method as recited in claim 6, further comprising: receiving, via a programmatic interface associated with a profile repository, an indication of the profile record, wherein the profile record includes one or more roles and responsibilities of the particular entity with respect to one or more security-sensitive data artifacts.

8. The method as recited in claim 6, further comprising: determining, based at least in part on the profile record, a particular access path to a particular data artifact of the one or more data artifacts, to which the particular entity has been granted permission; and
storing the particular access path in the repository of access paths.

9. The method as recited in claim 5, wherein the particular entity comprises one of: (a) an employee of the organization or (b) a computer program.

10. The method as recited in claim 5, further comprising: selecting, by the security threat candidate detector, the security management component from among a plurality of security management components based at least in part on a risk weight associated with a result of one or more of the first and second threat identification analyses.

11. The method as recited in claim 5, further comprising: determining, by the selected security management component, that operations of the particular entity analyzed in the first and second security analyses do not represent a security breach.

12. The method as recited in claim 5, wherein at least a first artifact of the one or more data artifacts is stored at a multi-tenant device of a provider network.

13. The method as recited in claim 5, wherein the one or more stored suspect behavior templates include a particular suspect behavior template representing one or more of: (a) repeated unsuccessful attempts to access one or more data artifacts, (b) occurrences of data accesses at times outside a work schedule, (c) transfers of data exceeding a threshold data set size, or (d) a use of a particular data transfer mechanism.

14. The method as recited in claim 5, further comprising performing, by the security threat candidate detector:
sorting, prior to the examining, the set of activity log records based at least in part on one or more of: (a) sensitivity metrics assigned to the one or more data artifacts or (b) respective roles assigned to the plurality of entities.

15. One or more non-transitory computer-accessible storage media storing program instructions that when executed on or across one or more processors implement:
a security threat candidate detector to:
obtain a set of activity log records from a plurality of activity log record collectors associated with a plurality of data artifacts of an organization, indicative of access requests directed at the data artifacts on behalf of a plurality of entities, wherein the plurality of entities includes at least a first computer program, and wherein the set of activity log records includes a first activity log record associated with a particular entity of the plurality of entities and with at least one data artifact of the plurality of data artifacts;
determine, in a first threat identification analysis, that the first activity log record indicates at least one access request which is not represented in a repository of access paths as a legitimate way by which the at least one data artifact of the plurality of data artifacts may be accessed by the particular entity of the plurality of entities;
determine, in a second threat identification analysis triggered at least in part by the determination that the at least one access request is not represented in the repository of access paths as a legitimate way by which the at least one data artifact may be accessed by the particular entity of the first threat identification analysis, whether an overlap exists between a behavior pattern of the particular entity, indicated by a plurality of the activity log records including the first activity log record, and one or more patterns of behavior of one or more stored suspect behavior templates, wherein the one or more stored suspect behavior templates are separate from the repository of access paths, and the one or more patterns of behavior of the one or more stored suspect behavior templates are identified as being correlated with one or more security threats;
based at least in part on the determination that an overlap exists in the second threat identification analyses, identify the particular entity as a threat with respect to the first data artifact;
disable one or more network paths, or rescind access permissions, to prevent the particular entity, identified as the threat, from accessing the first data artifact, to protect the first data artifact from the particular entity; and a learning engine comprising:

a machine learning or artificial intelligence engine configured to apply one or more machine learning algorithms or one or more artificial intelligence techniques to the plurality of activity log records to identify one or more security threats from the plurality of the activity log records;

the learning engine configured to:

generate, based on the identification of the one or more security threats, additional one or more suspect behavior templates that include one or more patterns of behavior correlated with one or more one or more of the security threats; and initiate addition of the additional one or more suspect behavior templates to a suspect behavior template repository for use to determine whether an overlap between a behavior pattern and the additional one or more suspect behavior templates, exists.

16. The one or more non-transitory computer-accessible storage media as recited in claim 15, wherein the instructions when executed on or across the one or more processors of the security threat candidate detector:

assign, based at least in part on a stored profile record of the particular entity, a risk weight to a result of one or more of the first and second threat identification analyses.

17. The one or more non-transitory computer-accessible storage media as recited in claim 15, wherein the particular entity comprises one of: (a) an employee of the organization or (b) a computer program.

18. The one or more non-transitory computer-accessible storage media as recited in claim 15, wherein the instructions when executed on or across the one or more processors of the security threat candidate detector:

select the security management component from among a plurality of security management components based at least in part on a risk weight associated with a result of one or more of the first and second threat identification analyses.

19. The one or more non-transitory computer-accessible storage media as recited in claim 15, wherein the one or more stored suspect behavior templates include a particular suspect behavior template representing one or more of: (a) repeated unsuccessful attempts to access one or more data artifacts, (b) occurrences of data accesses at times outside a work schedule, (c) transfers of data exceeding a threshold data set size, or (d) a use of a particular data transfer mechanism.

* * * * *